United States Patent
Wang et al.

(10) Patent No.: US 10,344,105 B2
(45) Date of Patent: Jul. 9, 2019

(54) PROCESS FOR MAKING POLYETHYLENE COPOLYMERS WITH A REVERSED COMONOMER DISTRIBUTION

(71) Applicant: Formosa Plastics Corporation, USA, Livingston, NJ (US)

(72) Inventors: Zhiming Wang, Port Lavaca, TX (US); Guangxue Xu, Port Lavaca, TX (US); Chih-Jian Chen, Port Lavaca, TX (US)

(73) Assignee: Formosa Plastics Corporation, USA, Livingston, NJ (US)

( * ) Notice: Subject to any disclaimer, the term of this patent is extended or adjusted under 35 U.S.C. 154(b) by 0 days.

(21) Appl. No.: 15/669,580

(22) Filed: Aug. 4, 2017

(65) Prior Publication Data
US 2019/0040160 A1     Feb. 7, 2019

(51) Int. Cl.
*C08F 10/02*     (2006.01)
(52) U.S. Cl.
CPC .................... *C08F 10/02* (2013.01)
(58) Field of Classification Search
None
See application file for complete search history.

(56) References Cited

U.S. PATENT DOCUMENTS

| | | |
|---|---|---|
| 5,210,167 A | 5/1993 | Firdaus et al. |
| 5,258,345 A | 11/1993 | Kissin et al. |
| 5,258,449 A | 11/1993 | Firdaus et al. |
| 5,550,094 A | 8/1996 | Ali et al. |
| 6,043,326 A | 3/2000 | Sillantaka et al. |
| 7,618,913 B2 | 11/2009 | Xu et al. |
| 8,546,499 B2 * | 10/2013 | Garroff ................ C08F 210/16 526/124.7 |
| 8,993,693 B2 | 3/2015 | Lu et al. |
| 9,487,608 B2 | 11/2016 | Lu et al. |

FOREIGN PATENT DOCUMENTS

EP        0435557 A2 *   7/1991   .............. C08F 10/00

OTHER PUBLICATIONS

Farid et al., "Development of Mathematical Model for a Polyethylene Fluidized Bed Reactor," IRACSt—Engineering Science and Technology: An International Journal (ESTIJ), vol. 2, No. 5, pp. 935-944 (2012). (Year: 2012).*
Voronkov, M. G. E., IUzhelevsk'ii, I. A., & Mileshkevich, V. P. (1978). The Siloxane bond: physical properties and chemical transformations. Consultants Bureau.
(Continued)

*Primary Examiner* — Catherine S Branch
(74) *Attorney, Agent, or Firm* — Jones Walker LLP

(57) ABSTRACT

The present invention relates to a process for the (co) polymerization of olefins to make polyethylene (co)polymers having sporadic long chain branches in high molecular weight fractions and a high molecular weight tail along with reversed comonomer composition distribution for improving processability, melt strength and optical properties. Such polyethylene (co)polymers have been prepared with a process comprising the reaction of at least the following components: (a) an advanced Ziegler-Natta catalyst precursor comprising titanium; (b) an activator comprising organohalogenous aluminum compounds; (c) ethylene; and (d) one or more alpha-olefins.

21 Claims, 3 Drawing Sheets

(56) References Cited

OTHER PUBLICATIONS

P.J. DesLauriers, D.C. Rohlfing, and E.T. Hsieh, Quantifying short chain branching microstructures in ethylene 1-olefin copolymers using size exclusion chromatography and Fourier transform infrared spectroscopy (SEC-FTIR) Polymer, 2002, 43, 159.

L. Wild., T. R. Ryle, D. C. Knobeloch, and I. R. Peat, Determination of branching distributions in polyethylene and ethylene copolymers J. Polym. Sci. Polym. Phys. Ed., 1982, 20, 441.

Graessley W.W. Viscosity of Entangling Polydisperse Polymer, J. Chem. Phys. 1967, 47, 1942-1953.

J. Janzen and R.H. Colby, Diagnosing long-chain branching in polyethylenes, Journal of Molecular Structure 1999, 485-486, 569-584.

Wallace W. Yau, A rheology theory and method on polydispersity and polymer long-chain branching, Polymer 2007, 48, 2362-2370.

\* cited by examiner

PROCESS FOR MAKING POLYETHYLENE COPOLYMERS WITH A REVERSED COMONOMER DISTRIBUTION

BACKGROUND OF THE INVENTION

1. Field of the Invention

The present invention relates to a process for making polyethylene copolymers with a reversed comonomer distribution and sporadic long chain branches for improving processability, melt strength and optical properties, while maintaining excellent dart impact and tear strengths. The present invention also relates to a process for making an olefin prepolymer made by ethylene polymerization with a catalyst precursor and an organohalogenous aluminum compound in-situ prepared by reacting alkylaluminoxane with halogenated alkylaluminum compounds, such that the prepolymer has sporadic long chain branches in high molecular weight fractions.

2. Description of the Related Art

In the last three decades linear low density polyethylene (LLDPE) polymers with a density of 0.900-0.945 g/mL have seen increasingly commercial importance. They have penetrated almost all the traditional markets of polyethylene, including blown and cast films, injection molding, blow molding, piping, tubing, and wire and cable manufacturing. Intensive research has been directed to development of high performance LLDPE resins having improved impact strength, higher toughness, higher transparency, less low molecular weight component content, narrower compositional distribution, and enhanced processability. Catalyst systems are crucial for producing such LLDPE. Ideal commercial catalyst systems shall include the following characteristics: (1) high activity ($>10^6$ PE g/mol cat hr) and productivity; (2) good particle morphology and flowability; (3) minimal particle static and easy operability without resin stickiness, chunk formation, or reactor fouling for gas phase polymerization processes; (4) good hydrogen response for molecular weight control; (5) excellent comonomer response for producing polymers with varying range of density; and (6) uniform active site distribution for producing polymers with desirable molecular weight, molecular weight distribution, and homogeneous comonomer composition (or short chain branch) distribution. To this end, polyolefin catalyst systems have been continuously renovated.

Transition metal catalyst systems, including Ziegler-Natta catalysts, metallocene, and other single-site catalysts, are widely used for producing LLDPE in slurry, gas phase, or, solution processes. Conventional Ziegler-Natta catalysts are mostly supported onto magnesium chloride and/or silica for achieving high activity, good particle morphology and ease process operability. They usually show less sensitive hydrogen response and poor comonomer response, and produce LLDPE (ZN LLDPE) polymers with broad molecular weight distribution and comonomer compositional distribution, which show good physical properties in regard to tensile and tear strengths, but low dart impact strength, relatively poor optical properties, and moderate processability. On the other hand, metallocene or single site catalysts normally must be supported onto silica-based carriers with appropriate surface area ($>200$ m$^2$) and pore size ($>1.5$ mL/g) for achieving desirable polymerization kinetics and particle morphology in the gas phase and slurry process. They are sensitive to hydrogen and have better comonomer response, and produce LLDPE (m-LLDPE) polymers with narrow molecular weight distribution and relatively homogeneous comonomer compositional distribution, which show excellent optical properties and high dart impact strength, but poor tear strength, especially in machine direction (MD), and poor processability.

U.S. Pat. Nos. 5,258,345 and 5,550,094 disclose a Ziegler-Natta catalyst system, which comprises a silica supported catalyst precursor and an activator of dimethlyaluminum chloride (DMAC), for producing LLDPE polymers with a bimodal MWD, particularly those containing a high molecular weight fraction. The catalyst precursor is prepared by contacting a carrier (such as silica) with an organomagnesium compound (such as dibutylmagnesium) to incorporate magnesium into the carrier, and then treating the carrier in sequence with a silicon compound, a transition metal compound, and an organomagnesium compound. The precursor can be activated with DMAC or a mixture of DMAC and a trialkylaluminum compound. However, DMAC alone as activator shows relatively low activity and alpha olefin oligomerization, which may foul a gas phase fluidized bed polymerization reactor. High ratio of DMAC to trialkylaluminum (30:1 to 300:1) is required to achieve broad molecular weight distribution and maintain high molecular weight tail. U.S. Pat. Nos. 5,210,167 and 5,258,449 report the film properties of the LLDPE polymers made from this catalyst precursor activated with DMAC or with diethylaluminum chloride (DEAC)/tri(n-hexyl)aluminum (TnHAL) pretreatment and DMAC activation. The LLDPE polymer films contain a significant portion of high molecular weight components with an $M_z/M_w$ ratio of greater than 3.5, and exhibit improved optical properties and impact properties. However, the dart impact strength is still much lower than that from typical m-LLDPE polymers. The other polymer properties, such as comonomer compositional distribution, MD tear strength, and processability, such as melt pressure and melt strength, are not mentioned.

U.S. Pat. Nos. 6,043,326 and 8,546,499 disclose a process for copolymerizing ethylene and alpha-olefins using a halogen compound based procatalyst and a cocatalyst from a 1:1 mixture of TEA/EADC or TEA/DEAC. The procatalyst is prepared by depositing an alkyl metal chloride (a product from a branched aliphatic monoalcohol and Mg dialkyl), a chlorine-containing Ti compound (TiCl$_4$), onto an inorganic support, such as EADC treated silica. Relatively high Al/Ti ratio ($>15$) is needed for achieving decent polymerization activity and productivity and large amount of chain transfer agent (H$_2$) required for regulating molecular weight of the product. This may bring about issues of poor operability for gas phase polymerization, such as high static in the reactor, chunk formation and sticky product. The resulting LLDPE polymers show more uniform comonomer composition distribution profile across the molecular weight distribution, compared to LLDPE produced without using a halogenated cocatalyst. However, there is no mention of the processability and melt strength, physical properties (dart impact and tear strengths), and optical properties (haze, clarity and gloss) of the product.

Accordingly, a new catalyst and/or process is needed having good process operability and high polymerization activity, and for producing LLDPE polymers which have the merits of both ZN LLDPE and m-LLDPE, such as desirable molecular weight and molecular weight distribution, as well as uniform comonomer composition distribution, which provide blown films with desirable physical properties such as high MD tear and dart impart strengths, excellent optical properties, and good processability.

Assignee's prior patents, such as U.S. Pat. Nos. 7,618,913, 8,993,693, and 9,487,608, describe a highly active supported Ziegler-Natta catalyst system with a nitrogen-based electron donor for producing unique ethylene copolymer. Both catalyst component and a prepolymerized catalyst component, activating with trialkylaluminum compound, produce ethylene-based polymer or co-polymer (LLDPE) having narrower molecular weight distribution, more uniform comonomer composition distribution, and better mechanical properties, such as dart impact and tear strengths. The blown films from the said LLDPE polymer show a MD tear strength that is higher than super-hexene ZN LLDPE and dart impact strength in par with m-LLDPE. Fractionation analysis of the LLDPE polymer showed that high molecular weight fractions with $M_w$>30,000 g/mol have flat comonomer composition distribution. However, the intrinsic viscosity of these fractions conforms to Mark-Houwink equation, indicating only linear structure exists in these high MW fractions. The linear and very high molecular weight (>30,000 g/mol) polymer chains tend to form thicker crystallization lamella and causes rough surface for blown films. Accordingly, the films made with the LLDPE polymer show inferior optical properties with a haze of >21%, compared to those from a typical m-LLDPE or ethylene/1-octene copolymer (C8-LLDPE), made by solution process, with a haze of lower than 12%. These poor optical properties limit their applications for clarity films. In addition, the linear structure along with very high molecular weight and narrow molecular weight distribution also leads to undesirable rheological behavior and processability. For example, the melt strength of the said polymer is not sufficient for applications requiring certain extensional flow properties during processing, such as blow molding and geomembrane production.

Therefore, there is a need to further improve the catalyst system and develop a compatible process through which catalyst morphology and flowability is improved, operation efficiency of producing LLDPE polymers with lower density is enhanced without issues of reactor fouling, catalyst activity and catalyst productivity is enhanced, and the microstructure of the LLDPE polymers, such as molecular weight distribution, comonomer composition distribution, and the long chain branching content in high molecular weight fractions, is tuned to the desirable level for tailoring polymer properties. LLDPE polymers with the desirable microstructure provide the corresponding blown films with improved processability, enhanced melt strength, and improved optical properties comparable to mLLDPE and C8 LLDPE, while maintaining better MD tear strength better than super-hexene ZN LLDPE and superior dart impact strength in par with m-LLDPE.

SUMMARY OF THE INVENTION

In accordance with one embodiment, the present invention relates to a process for the (co)polymerization of olefins to make polyethylene (co)polymers having sporadic long chain branches in high molecular weight fractions and a high molecular weight tail along with reversed comonomer composition distribution for improving processability, melt strength and optical properties. Such polyethylene (co)polymers have been prepared with a process comprising reacting of at least the following components with each other:
a) an advanced Ziegler-Natta catalyst precursor comprising Ti, Mg, Si, halogen and nitrogen.
b) an activator comprising organohalogenous aluminum compounds by reacting alkylaluminoxane with halogenated alkylaluminum compound;
c) ethylene, and
d) one or more alpha-olefins copolymerizing with ethylene, being characterized in that the organohalogenous aluminum compound is prepared in-situ by reacting alkylaluminoxane with halogenated alkylaluminum during (co)polymerization.

In accordance with another embodiment of the present invention, polyethylene (co)polymers having sporadic long chain branches in high molecular weight fractions and a high molecular weight tail along with reversed comonomer composition distribution are prepared with a process comprising reacting at least the following components with each other:
(a) a prepolymer (prepolymerized catalyst component) prepared from polymerization of ethylene with or without one or more alpha-olefins, optionally under hydrogen, in the presence of (i) an advanced Ziegler-Natta catalyst precursor comprising Ti, Mg, Si, halogen and nitrogeand, and (ii) an activator comprising organohalogenous aluminum compounds by reacting alkylaluminoxane with halogenated alkylaluminum compound;
(b) ethylene, and
(c) one or more alpha-olefins copolymerizing with ethylene without cocatalyst in the presence of hydrogen.

In accordance with yet another embodiment, the present invention provides a process for preparing a prepolymer (prepolymerized catalyst component) by (co)polymerizing ethylene and/or alpha olefins in the presence of a unique catalyst precursor and an organohalogenous aluminum compound prepared in-situ by reacting alkylaluminoxane with halogenated alkylaluminum compounds. The said prepolymer has an amount ranging from 0.1 to 1000 g per g of the said solid catalyst precursor, being characterized by its sporadic long chain branches in the high molecular weight fractions and an improved comonomer response for the copolymerization of ethylene and alpha-olefin without using additional co-catalyst. The said catalyst precursor is prepared by contacting a magnesium-based composite support, in-situ prepared by contacting metallic magnesium with alkyl halide or aromatic halide in the presence of an organic silicon compound having the formula $R^1_m Si(OR^2)_n$, wherein $R^1$ and $R^2$ are $C_1$-$C_{20}$ hydrocarbyl, m=0-3, n=1-4, and m+n=4, and wherein each $R^1$ and each $R^2$ may be the same or different, with a compound having the formula $R^3_x SiX_y$, wherein $R^3$ is $C_1$-$C_{20}$ hydrocarbyl, X is halogen, x=0-3, y=1-4, and x+y=4, and wherein each X and each $R^3$ may be the same or different, a compound having the formula $MX_4$, wherein M is an early transition metal such as Ti, a compound having the formula $M(OR^4)_a X_{4-a}$, wherein M is an early transition metal such as Ti, wherein $R^4$ is $C_1$-$C_{20}$ hydrocarbyl, X is halogen, and 0≤a≤4, a substituted aromatic compound containing nitrogen such as 2,6-dimethylpyridine and 8-quinolinol and 2-methyl-8-quinolinol, and an alkyl halide or aromatic halide compound having the formula $R^5 X$, wherein $R^5$ is $C_1$-$C_{20}$ hydrocarbyl.

The polyethylene copolymers produced according to the present invention have sporadic long chain branches and reversed comonomer composition distribution or short chain branching distribution (SCBD) in the high molecular weight fractions. The LLDPE polymers produced have higher bulk density, and show excellent optical properties, enhanced melt strength and improved processability, while maintaining excellent tear strength better than super hexane LLDPE and dart impact properties comparable to m-LLDPE. They are potentially suitable for both polymer blown film and geomembrane applications.

DETAILED DESCRIPTION OF THE INVENTION

Figure 1:
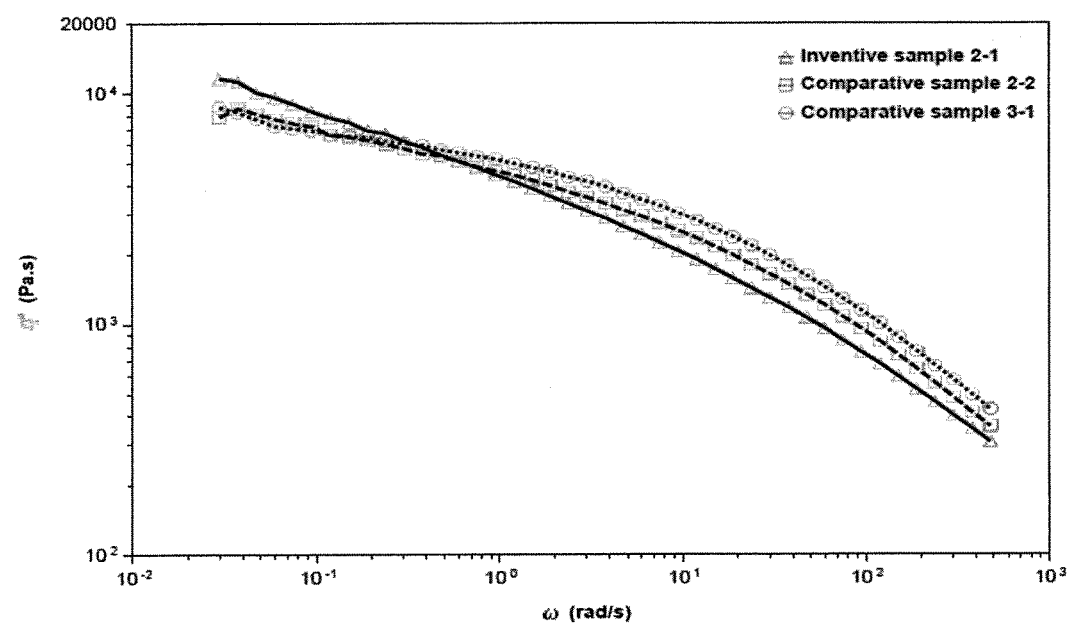
FIG. 1 shows rheological curves for the inventive LLDPE samples 2-1 and the comparative LLDPE samples 2-2 and 3-1 of Table 1, respectively.

In order to tailor LLDPE polymer with the desirable microstructure which provide the corresponding blown films with improved processability, enhanced melt strength, and improved optical properties comparable to mLLDPE and C8 LLDPE, while maintaining better MD tear strength than super-hexene ZN LLDPE and superior dart impact strength in par with m-LLDPE, we further improve the catalyst system and develop a compatible polymerization process through which catalyst and polymerization process morphology and flowability is improved, operation efficiency of producing LLDPE polymers with lower density could be enhanced without issues of reactor fouling, catalyst activity and catalyst productivity could be enhanced, and the microstructure of the LLDPE polymers, such as molecular weight distribution and unique comonomer composition distribution, and the long chain branching content in high molecular weight fractions could be tuned. The present invention relates to an advanced magnesium-based catalyst precursor, and/or a special ethylene prepolymer, a process for preparing the said ethylene prepolymer from the said catalyst precursor, and a process for making polyethylene polymers, including high density polyethylene, medium density polyethylene (MDPE) and linear low density polyethylene (LLDPE). The present invention provides a process to produce polyethylene (co)polymers, comprising reacting of at least the following components with each other:

(a) an advanced Ziegler-Natta catalyst precursor comprising Ti, Mg, Si, halogen and nitrogen.
(b) an activator comprising organohalogenous aluminum compounds by reacting alkylaluminoxane with halogenated alkylaluminum compound;
(c) ethylene, and
(d) one or more alpha-olefins copolymerizing with ethylene, being characterized in that the organohalogenous aluminum compound is in-situ prepared by reacting alkylaluminoxane with halogenated alkylaluminum during (co)polymerization.

This invention also provides another process to produce the said ethylene copolymer, comprising reacting of at least the following components with each other:

(a) a prepolymer (prepolymerized catalyst component) prepared from polymerization of ethylene with or without one or more alpha-olefins, optionally under hydrogen, in the presence of (i) an advanced Ziegler-Natta catalyst precursor comprising Ti, Mg, Si, halogen and nitrogen, and (ii) an activator comprising organohalogenous aluminum compounds by reacting alkylaluminoxane with halogenated alkylaluminum compound;
(b) ethylene, and
(c) one or more alpha-olefins copolymerizing with ethylene without cocatalyst in the presence of hydrogen.

The catalyst precursor discussed above is prepared by the following reaction, as depicted schematically and described in detail as follows:

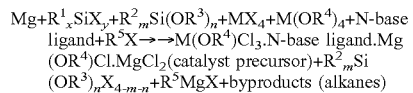

Firstly, an organic silicon complex is prepared in situ by reacting alkoxysilane ester, $R^2_m Si(OR^3)_n$, with halogen-substituted silane, $R^1_x SiX_y$. The reaction is preferably conducted in the presence of magnesium and halogenated alkyl group, such as alkyl chloride, which, without being limited to this position, is believed to form alkyl magnesium halide. The mixture is heated for 30 to 60 minutes, preferably 45 to 60 minutes, in a non-polar solvent to 50 to 100° C., preferably to 65 to 85° C.

The reactions between alkoxysilane ester with halogen-substituted silane such as silicon tetrachloride ($SiCl_4$) are described by M. G. Voronkov, V. P. Mileshevich, and A. Yu in the book "The Siloxane Bond", Plenum Publishing Corp., New York, 1978. The reaction can be carried out in a non-polar solvent by heating the mixture to 50 to 100° C., preferably to 65° C. to 85° ° C. The duration of heating is not generally critical. One acceptable procedure is to heat for 30 to 60 minutes once the desired temperature is obtained. The molar ratio of alkoxysilane ester to halogen-substituted silane is from 0.5 to 3.0, and more preferably from 0.8 to 1.5. Some percentage of the alkoxysilane ester may remain in excess and thus, not reacted, in the final product organic silicon product. The organic silicon product can be and preferably is used in the next steps in situ without further separation or characterization.

The halogen-substituted silane has the formula $R^1_x SiX_y$ where $R^1$ is a $C_1$-$C_{20}$ hydrocarbyl, which for present purposes includes both unsubstituted and substituted species, including halogen substituted species, X is halogen, x is 0-3, y is 1-4, and x+y=4. More than one halogen X may be employed in the halogen-substituted silane. Suitable halogen-substituted silane compounds include silicon tetrachloride, tetrabromosilane, tetrafluorosilane, benzyltrichlorosilane, bis(dichlorosilyl)methane, 2-bromoethyltrichlorosilane, t-butyldichlorosilane, t-butyltrichlorosilane, 2-(carbomethoxy)ethyltrichlorosilane, 2-chloroethylmethyl dichlorosilane, 2-chloroethyltrichlorosilane, 1-chloroethyltrichlorosilane, chloromethylmethyldichlorosilane, ((Chloromethyl)phenylethyl)trichlorosilane, chloromethyltrichlorosilane, 2-cyanoethylmethyldichlorosilane, cyclohexyltrichlorosilane, cyclopentyltrichlorosilane, cyclotetraemethylenedichlorosilane, cyclotrimethylenedichlorosilane, 1,5-dichlorohexamethyltrisiloxane, (dichloromethyl)trichlorosilane, dichlorosilane, 1,3-dichlorotetramethyldisiloxane, diethyoxydichlorosilane, ethylmethyldichlorosilane, ethyltrichlorosilane, heptyltrichlorosilane, hexachlorodisilane, hexachlorodisiloxane, isobutyltrichlorosilane, methyltrichlorosilane, octyltrichlorosilane, pentyltrichlorosilane, propyltrichlorosilane, and trichloromethyltrichlorosilane. It is preferred to employ tetrachlorosilane, allyltrichlorosilane, ethyltrichlorosilane, methyltrichlorosilane, and dichlorodiphenylsilane.

Suitable alkoxysilane ester compounds have the formula $R^2_m Si(OR^3)_n$. $R^2$ and $R^3$ are independently any $C_1$-$C_{20}$ hydrocarbyl, which for present purposes includes both unsubstituted and substituted species, including halogen substituted species, m is 0-3, n is 1-4, and m+n=4. More than one hydrocarbyl or substituted hydrocarbyl group may be employed as the $R^2$ component, and more than one hydrocarbyl or substituted hydrocarbyl group may be employed as the $R^3$ component. Suitable alkoxysilane ester compounds include tetramethoxysilane, tetraethoxysilane, tetraisopropoxysilane, tetrapropoxysilane, tetraethoxysilane, tetraisobutoxysilane, tetraphenoxysilane, tetra(p-methylphenoxy)silane, tetrbenzyloxysilane, tetrakis(2-methoxyethoxy) silane, tetrakis(2-ethylhexoxy)silane, tetraallyloxysilane, methyltrimethoxysilane, methyltriethoxysilane, mehtyltributoxysilane, methyltriphenoxysilane, ethyltriethoxysilane, ethyltriisobutoxysilane, ethyltriphenoxysilane, allyltrimethoxysilane, octadecyltrimethoxysilane, octadecyltriethoxysilane, octyltriethoxysilane, phenyltrimethoxysilane, phenyltriethoxysilane, benzyltriphenoxysilane, methyltrialllyloxysilane, dimethyldimethoxysilane, dimethyldiethoxysilane, dimethyldiisopropyloxysilane, dimethyldibutoxysilane, dimethyldihexyloxysilane, dimethyldiphenoxysilane, diethyldiethoxysilane, diethyldiisobutoxysilane, diethyldiphenoxysilane, dibutyldiisopropyloxysilane, dibutyldibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyldiethoxysilane, divinyldiphenoxysilane, diallyldipropoxysilane, diphenyldiallyoxysilane, 1,1,1,3,3-pentamethyl-3-acetoxydisiloxane, triethoxysilane, trimethoxysilane, triethoxychlorosilane, and trimethoxychlorosilane. Particularly preferable compounds are tetramethoxysilane, tetraethoxysilane, tetraisopropoxysilane, tetrapropoxysilane, tetrabutoxysilane, tetraisobutoxysilane, and combination thereof.

Secondly, the organic silicon complex or organic silicon complex containing nitrogen is contacted with a transition metal compound, preferably a titanium compound, to form an organic silicon complex containing transition metal. The molar ratio of silicon complex to the titanium compound is preferably from 0.1 to 3.0, and more preferably from 0.5 to 2.0. The reaction is preferably conducted at 80° C., and the duration of heating may be from 30 to 60 minutes, preferably 40 minutes. Once the desired temperature is obtained, the reaction generates an organic silicon complex containing transition metal, which is typically a brown product when titanium is employed. The organic silicon complex containing transition metal can be used, and desirably is used, for the following steps in situ without further separation or characterization.

The transition metal compounds that are acceptable for this process include alkoxytitanium halide compounds having the formula $Ti(OR^4)_4X_{4-n}$. $R^4$ is a $C_1$-$C_{20}$ hydrocarbon, X is a halogen, and $0 \leq n \leq 4$. For present purposes, $R^4$ may be unsubstituted or substituted, including halogen substituted. Each $R^4$ may be the same or different. The titanium compound $Ti(OR^4)_4X_{4-n}$ may be prepared in situ prepared by reacting a titanium halide compound with $Ti(OR^4)_4$ and/or $Ti(OR^4)_3X$ or by reacting corresponding alcohol, $R^4OH$, with a titanium halide compound. Alternatively, $Ti(OR^4)_4X_{4-n}$ may be formed before addition to the reactor by preconditioning a titanium halide compound with $Ti(OR^4)_4$, $Ti(OR^4)_3$ or $R^4OH$. Preconditioning may be achieved by mixing a titanium halide compound in hexane with $Ti(OR^4)_4$ or $Ti(OR^4)_3$ in hexane and stirring at 75 to 80° C. for 0.5 to 1 hour, resulting in a $Ti(OR^4)_4X_{4-n}$ complex.

Examples of the titanium halide compound include $TiCl_4$, $TiBr_4$, $TiI_4$, $TiCl_3 \cdot nTHF$ and $3TiCl_3 \cdot AlCl_3$. Among these titanium halides, $TiCl_4$ and $3TiCl_3 \cdot AlCl_3$ are preferred. Titanium compounds with the structural formula $Ti(OR^4)_4$ or $Ti(OR^4)_3X$ include trimethoxymonochlorotitanium, triethoxyfluorotitanium, triethoxychlorotitanium, tetraethoxytitanium, tripropoxyfluorotitanium, tripropoxychlorotitanium, tetra-n-propoxytitanium, tetraisopropoxytitanium, tributoxyfluorotitanium, tributoxychlorotitanium, triisobutoxychlorotitanium, tetra-n-butoxytitanium, tetra-isobutoxytitanium, dipentoxydichlorotitanium, tripentoxymonochlorotitanium, tetra-n-pentyloxytitanium, tetracyclopentyloxytitanium, trioctyloxymonochlorotitanium, 2-ethylhexoxytitanium trichloride, butoxytitanium trichloride, tetra-n-hexyloxytitanium, tetracyclohexyloxytitanium, tetra-n-heptyloxytitanium, tetra-n-octyloxytitanium, tetra-2-ethylhexyloxytitanium, tri-2-ethylhexyloxymonochlorotitanium, tetranonyloxytitanium, tetradecyloxytitanium, tetraisobornyloxytitanium, tetraoleyloxytitanium, tetraallyloxytitanium, tetrabenzyloxytitanium, tetrabenzohydryloxytitanium, triphenoxytitanium, tetr-o-methylphenoxytitanium, tetraphenoxytitanium, tetra-o-methylpheoxytitanium, tetra-m-mehtylpheoxytitanium, tetra-o-methylphenoxytitanium, tetra-m-methylphenoxytitanium, tetra-1-naphthyloxytitanium, tetra-2-napthyloxytitanium and mixtures thereof. The preferred $Ti(OR^4)_4$ or $Ti(OR^4)_3X$ compounds are 2-ethylhexoxytitanium trichloride, butoxytitanium trichloride, tetra-n-propoxytitanium, tetraisopropoxytitanium, tetra-n-butoxytitanium, tetraisobutoxytitanium, dibutoxydichlorotitanium, isobutoxytrichlorotitanium and propoxytrichlorotitanium.

Thirdly, the organic silicon complex containing titanium is further contacted with a substituted aromatic ring nitrogen compound to form a complex containing Si—Ti—N compounds. The substituted aromatic ring nitrogen compound is preferably employed in amounts sufficient to have a molar ratio of substituted aromatic ring nitrogen compound to transition metal compound as added in the previous processing step of typically from 0.010:1 to 50:1, preferably from 0.02:1 to 10:1, and most preferably from 0.1:1 to 5:1. Although the conditions are not generally critical, one acceptable procedure is to heat at 80° C. for 30 to 100 minutes, preferably 60 minutes. Once the desired temperature is obtained, the reaction generates a complex with dark brown color. The said complex can be used, and preferably is used, for the next steps in situ without further separation or characterization.

The N-base ligand compounds as an electron donor is a substituted aromatic ring nitrogen compound, and can be selected from the substituted pyrimidine, dipyridyl, pyrazine, terpyridine and quinoline compounds. Representative examples of the compounds include 2,6-dimethylpyridine, 2,6-diisopropylpyridine, 2,6-di-tert-butylpyridine, 2,4,6-trimethylsilylpyridine, 2,6-dimethoxypyridine, 2,6-bis(chloromethyl)-pyridine,2,2':6',2"-terpyridine, 2,2'-dipyridyl, 6,6'-dimethyl-2,2'-dipyridyl, 2,2'-diquinolyl, 4-(p-tolyl)-2,2':6', 2"-terpyridine, 2,6-dimethypyrazine, 2,3,5-trimethylpyrazine, 2,4,6-trimethyl-s-triazine, 2,3,5,6-tetramethylpyrazine, quinaldine, pyrimidine, pyrazine, pentafluoropyridine, pentachloropyridine, 2,4,6-trimethylpyrimidine, 3-methylpyridazine, 2,6-dimethylpyridazine, 2,6-pyridinecarboxylic acid, 2,6-pyridinediacetate, 2,6-pyridinecarbonyl dichloride, 2,6-pyridinecarboxaldehyde, 2,6-pyridinedicarboxamide, 2,6-pyridinedimetanol, 2,6-pyridinediethanol, 2,6-diacetylpyridine, 2,6-bis(chloromethyl) pyridine, 2,6-bis(bromomethyl)pyridine, 2,6-pyridinecarbonitrile, quinoline, 2-quinolinecarbonitrile, 2-quninolinecarboxaldehyde, 4-quinolinecarbixaldehyde, quinoline-7-carbaldehyde, quninoline-8-methanol, 4-quinolinol, 5-quinolinol, 8-quinolinol, and mixture thereof. The most preferred example is 2,6-dimethylpyridine and 8-quinolinol and 2-methy-8-quinolinol.

Lastly, the Mg-based composite support catalyst precursor can be obtained by further contacting the said complex containing Si—Ti—N compounds with the in-situ yielded Mg-based composite support for 3 to 4 hours. Specifically, the magnesium halide composite support is in situ prepared by reacting metallic magnesium with an alkyl halide or aromatic halide in the presence of the complex containing Si—Ti—N compounds at a temperature of 75 to 90° C., preferably 75 to 80° C. The molar ratio of alkyl or aromatic halide to metallic magnesium is 1.0 to 3.5, preferably 1.2 to 2.0. The ratio of the complex containing Si—Ti—N compounds to metallic magnesium is 0.01 to 1.5, and preferably 0.05 to 0.5. Any type of magnesium powder may be used as the metallic magnesium source. Suitable alkyl or aromatic halides have the formula $R^5X$ wherein $R^5$ is an alkyl group typically containing 3 to 20 carbon atoms or an aromatic group typically containing 6 to 18 carbon atoms and X is a halogen, typically chlorine or bromine. Examples of alkyl or include butyl chloride and chlorobenzene.

The magnesium/titanium-based catalyst precursor is prepared in a non-polar solvent. Suitable non-polar solvents are materials in which all of the reactants used herein, e.g., the silicon compound, the transition metal compound, and electron donors are at least partially soluble and in liquid state at reaction temperatures. Preferred non-polar solvents are saturated hydrocarbons and include alkanes, such as isopentane, hexane, heptane, octane, and decane. A nitrogen atmosphere may be used to prevent exposure to air. The catalyst precursor may be stored in a slurry state under nitrogen for further pre-polymerization or dried into powder for further pre-polymerization or gas phase polymerizaiton.

The said catalyst precursor described above has good morphology and narrow particle size distribution and flowability. The said catalyst precursor is activated by special cocatalyst comprising of an organohalogenous aluminum compound in-situ prepared by reacting alkylaluminoxane with halogenated alkylaluminum compounds.

Alkylaluminoxane such as methylaluminoxane (MAO) was widely used to activate metallocene catalysts or single-site catalysts for producing m-LLDPE. However, we didn't see any benefit to activate Ziegler-Natta catalyst in prior arts. The halogenated alkylaluminum compounds were also widely report to be used in the Ziegler-Natta catalyst. As is well known in the art, when using halogenated alkylaluminum compounds as cocatalyst, Ziegler-Natta catalysts demonstrate very low activity. When using a combination of halogenated alkylaluminum compounds and triethyl aluminum (TEAL), as in U.S. Pat. Nos. 6,043,326 and 8,546,499, it was found that $SiO_2$-based Ziegler-Natta catalysts has good activity and improves commoner distribution to some extent.

In the present invention it is discovered that when an organohalogenous compound, in-situ prepared by reacting alkylaluminoxane with halogenated alkylaluminum compounds, used as cocatalyst in Ziegler-Natta catalysts, the corresponding polymer prepared has a sporadic long chain branches in high molecular weight fractions and a high molecular weight tail along with reversed comonomer composition distribution for improving processability, melt strength and optical properties.

It is believed that a typical reaction used to prepare the organohalogenous aluminum compound as cocatalysts is described in the following equation:

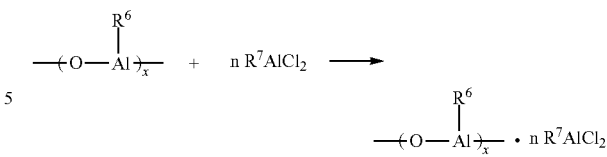

wherein the alkylalumoxane (C) may be oligomeric linear and/or cyclic alkylaluminoxanes, $R^6$ is $C_1$-$C_{20}$ hydrocarbyl, which for present purposes includes both unsubstituted and substituted species, including substituted species with halogen, alkoxide and hydride, and x is 1-40, preferably 3-20. The representative example of alkylaluminoxane is selected from methylalumoxane, modified methylalumoxane, tetraethyldialumoxane, tetrabutylalumoxane, bis(diisobutylaluminum) oxide, ethylalumoxane, isobutylalumnoxane, and polymethylalumoxane, and mixtures or combinations of thereoof, and more preferably modified methylalumoxane.

$R^7$ is $C_1$-$C_{20}$ hydrocarbyl, which for present purposes includes both unsubstituted and substituted species, including substituted species with halogen, alkoxide and hydride; n is typically 0.05 to 20, preferably 0.5 to 2. The mixing temperature between the alkyalumoxane and alkylaluminium dichloride is typically from −10 to 85° C., and preferably 20-60° C. The suitable alkylaluminum dihalides include methylaluminum dichloride, ethylaluminum dichloride, isobutylaluminum dichloride, isobutylaluminum dichloride, t-butylaluminum dichloride and amylaluminum dichloride, and ethylaluminum dichloride is more preferable.

The alkylaluminum dihalide may be prepared in situ via the reaction between aluminum trihalide and dialkylaluminum halide. The suitable aluminum trihalide includes aluminum trichloride, aluminum tribromide and aluminum triiodide. Aluminum trichloride is more preferable. The suitable example of dialkylaluminum is selected from dimethylaluminum chloride, diethylaluminium chloride, diisobutylaluminum chloride, di(t-butyl)aluminum chloride, and diamylaluminum chloride, and more preferably diethylaluminum chloride.

The alkylaluminum dihalide may also be prepared in situ via the reaction between alkene and dihaloaluminum hydride. The suitable dihaloaluminum hydride is selected from dichloroaluminum hydride, dibromoaluminum hydride, and diiodoalumminum hydride, and more preferably dichloroaluminum hydride. The examples of alkene contains 1 to 20 alkyl group with or without substitute species of halogen, alkoxide and hydride.

The modified methylalumoxane and ethylaluminum dichloride is preferably used for in-situ preparing the aforementioned organohalogenous aluminum compounds as cocatalyst. In one embodiment, the cocatalysts could be mixed prior to adding to the supported catalyst component for activation. In another embodiment, the cocatalysts could separately be added to the supported catalyst component for activation. It is particularly advantageous to prepare the organohalogenous aluminum compounds by reacting the organic aluminum compounds and the catalytically halogen organic aluminum compounds not earlier than 2 hours and preferably 1 hour before starting the copolymerization. The molar ratio of alkylaluminoxane to halogenated alkylaluminum compounds is 0.1 to 3. The preferable ratio of alkylaluminoxane to halogenated alkylaluminum compounds is 0.5 to 1.5.

The supported catalyst precursor is then activated with organohalogenous aluminum compounds to form a catalyst system. The molar ratio of the cocatalyst, such as organohalogenous aluminum compounds in-situ prepared to the titanium in the catalyst component is 0.05 to 500. The catalyst component may be activated in situ by adding the cocatalyst and catalyst component separately to the polymerization medium. It is also possible to combine the catalyst precursor and cocatalyst before their introduction into the polymerization medium, for example for 2 hours or less and at a temperature from −10 to 85°, and preferably 20 to 60° C.

Preparation of Ethylene Prepolymer or Prepolymerized Catalyst Component

The supported catalyst precursor, after activation with organohalogenous aluminum compounds may be subjected to prepolymerization in the presence of olefin, and produce an ethylene prepolymer or prepolymerized catalyst component, which is sequentially used for the gas phase polymerization. For example, the solid catalyst precursor and a cocatalyst component, such as an organohalogenous aluminum compound, are contacted with an olefin. Examples of the olefin used for the prepolymerization are ethylene, propylene, 1-butene and 1-hexene. The prepolymerization may be either homopolymerization or copolymerization. It may be preferable to make slurry containing the solid catalyst precursor using a solvent. Examples of suitable solvents include aliphatic hydrocarbons such as butane, pentane, hexane, heptane, and aromatic hydrocarbons such as toluene and xylene, and more preferably hexane. The cocatalyst amount is crucial for the kinetic and reactivity control. The organohalogenous aluminum compound may be used in a ratio of 0.1 to 100, preferably 0.5 to 50, calculated as the Al/Ti atomic ratio, that is, the atomic ratio of the Al atom in the organohalogenous aluminum compound to the Ti atom in the solid catalyst component. The more preferred ratio is 2 to 10. Hydrogen is an important factor affecting the prepolymerization activity and the molecular weight (or MI) control of the said ethylene prepolymer. The ratio of hydrogen to ethylene may typically be 0.01 to 10.0, and preferably 0.05 to 1.0. The hydrogen could be charged either only at the beginning of reaction or continually during the reaction. The temperature for the prepolymerization may generally be −30 to 100° C., and preferably from −10 to 85° C. The prepolymerization temperature is another factor for kinetics and MI control of the said ethylene prepolymer. Large temperature fluctuation during the prepolymerization should be avoided. The temperature fluctuation may typically be controlled within ±5.0° C., preferably within ±0.5° C. The prepolymerization time relates to the particle size and the yield of the said ethylene prepolymer produced. The yield and particle size may increase with prolonged prepolymerization time. The typical prepolymerizaiton time may be from 0.5 to 20 hours, and preferably from 1 to 12 hours. The yield of said ethylene prepolymer ranges from 0.1 to 1000 g per g of said solid catalyst precursor, and preferably 1.0 to 500 g per g of said solid catalyst precursor. For gas phase fluidized polymerization, the said ethylene prepolymer has a yield ranging from 20 to 160 g per mmol Ti of said solid catalyst precursor.

When used for gas phase polymerization, the ethylene prepolymer may be combined with inert diluents to form slurry or dried to obtain a free-flowing powder. The drying temperature is typically from 30 to 80° C., and preferably from 40 to 60° C. The average particle size of the ethylene prepolymer is typically from 100 to 500 micron, more preferably from 200 to 300 micron. In addition, small amount of fine particles (<80 micron) may also be produced. The typical fine particle content is from 2 to 30%, and preferably from 5 to 12%. High content of fine particles in the said ethylene prepolymer could bring about issues of high static and hot spots, and should be avoided in the gas phase polymerization. The MI or I2 of the ethylene prepolymer is typically from 0.02 to 100 g/10 min, and preferably 0.5 to 5 g/10 min. The solid powder of the ethylene prepolymer can be stored under nitrogen for a relatively long period time, typically from two weeks to a month, and maintain good activity in the following slurry or gas phase polymerization.

The advantage of using the prepolymer instead of the catalyst precursor directly for gas phase polymerization includes a) the improvement in the morphology of the catalyst with less fine particle content, which may increase the particle flowability and inhibit the otherwise dramatic initial activity and facilitate the catalyst to be used for gas phase polymerization in a fluidized bed reactor or stirring bed reactor; b) the ability of tuning the microstructure of the polymer or copolymer produced, such as comonomer composition distribution, to the desirable level for tailoring properties of the polymer product.

Copolymerization of Ethylene and Alpha-Olefin with Ethylene Prepolymer or Prepolymerized Catalyst Component Ethylene and alpha-olefins may be copolymerized with the said ethylene prepolymer by any suitable process. Such processes include polymerizations carried out in slurry, in suspension, in solution, or in gas phase. A preferred method for producing LLDPE resins is a gas phase process, including stirred bed reactors and fluidized bed reactors.

Standard polymerization conditions for production of polyolefin polymers by the method of the invention, such as the polymerization temperature, polymerization time, polymerization pressure, monomer concentration and hydrogen concentration should be selected. Typically the polymerization temperature should be below the sintering temperature of polymer particles for gas phase polymerization. For the production of ethylene copolymers, an operating temperature of 30 to 115° C. is acceptable, the one of 50 to 100° C. is preferred, and the one of 75 to 95° C. is more preferred. Temperatures of 75 to 90° C. are preferably used to prepare LLDPE products having a density of 0.90 to 0.92 g/mL; temperatures of 80 to 100° C. are preferably used to prepare LLDPE products having a density of 0.92 to 0.94 g/mL; and temperatures of 90 to 115° C. are used to prepare LLDPE products having a density of 0.94 to 0.96 g/mL. Molecular weight of the polymers may be suitably controlled with hydrogen when the polymerization is performed using the catalyst system described above. The control of molecular weight may be illustrated by changes in melt indexes (I2 and I21) of the polymer.

Copolymerizing the alpha-olefin comonomers with ethylene to achieve 1 to 5 mol percent of the comonomer in the copolymer results in the desired density ranges in the copolymers. The amount of the comonomer needed to achieve this result will depend on the particular comonomer(s) employed. It has been found that when using a gas phase catalytic polymerization reaction, 1-butene, 1-hexene and 4-methyl-1-pentene can be incorporated into ethylene-based copolymer chains with high efficiency. A relatively small concentration of 1-butene, 1-hexene or 4-methyl-1-pentene in the gas phase reactor can lead to a relatively large incorporation of 1-butene, 1-hexene or 4-methyl-1-pentene into the resulting copolymer. For example, 1-butene, 1-hexene or 4-methyl-1-pentene in amount up to 18 percent by weight, preferably 2 to 12 percent by weight, may produce LLDPE resins having a density of less than 0.940 g/mL.

LLDPE resins may be copolymers of ethylene with one or more $C_3$-$C_{10}$ alpha-olefins. Thus, copolymers having two types of monomer units are possible as well as terpolymers having three types of monomer units. Particular examples of such polymers include ethylene/1-butene copolymers, ethylene/1-hexene copolymers, ethylene/4-methyl-1-pentene copolymers, ethylene/propylene/1-butene terpolymers, ethylene/propylene/1-hexene terpolymers, ethylene/1-butene/1-hexene terpolymers. Particularly preferred comonomers are 1-hexene, 4-methyl-1-pentene, propylene, 1-butene and mixture thereof.

Polymer Characterization

The copolymer produced in accordance with the present invention may have a density of 0.960 g/mL or less, preferably 0.952 g/mL or less, or more preferably 0.940 g/mL or less. In accordance with certain aspects of the present invention, it is possible to achieve densities of less than 0.910 g/mL and even as low as 0.870 g/mL. Copolymer resins produced in accordance with the present invention preferably contain at least about 75 percent by weight of ethylene units. Preferably, the copolymer resins of the present invention contain at least 0.5 weight percent, for example, from 0.5 to 25 weight percent of an alpha-olefin.

The molecular weight of the copolymers may be controlled in a known manner, preferably by using hydrogen. With the catalysts produced according to the present invention, molecular weight may be suitably controlled with hydrogen when the polymerization is carried out at temperatures from 20 to 300° C. This control of molecular weight may be evidenced by a measurable positive change of the melting index ($I_2$).

The molecular weight distribution (MWD) of the polymers prepared according to the present invention, as expressed by the MFR values, varies from 10-40. MFR is the ratio of the high-load melt index (HLMI or $I_{21}$) to the melt index (MI or $I_2$) for a given resin (MFR=$I_{21}/I_2$). The ethylene/1-hexene copolymer having a density of 0.910 g/mL to 0.930 g/mL, in a preferred embodiment, has a melt index ratio ($I_{21}/I_2$) of between 20 and 30.

The polymers of the present invention have a molecular weight distribution, a weight average molecular weight to number average molecular weight ($M_w/M_n$), of from 2.5 to 80, preferably from 2.5 to 4.5, more preferably from 3.0 to 4.0, and most preferably from 3.2 to 3.8. The polymers have a ratio ($M_z/M_w$) of z-average molecular weight ($M_z$) to weight average molecular weight of greater than 2.5. In one embodiment, this ratio is from 2.5 to 3.8. In yet another embodiment, this ratio is from 2.5 to 3.5. The ratio of z-average molecular weight to weight average molecular weight ($M_z/M_w$) reflects inter- and/or intra-macromolecular entanglement and unique polymer rheological behavior.

Molecular weight measurements were carried out using a high temperature size exclusion chromatograph (SEC) (Polymer Char) equipped with a differential refractive index (DRI) and infrared (IR) (PolyChar, IR4) detectors, a Viscotek model 210R viscometer and a multi-angle laser light scattering (MALLS) apparatus (Wyatt, DAWN EOS). All measurements were taken at 145° C. using 1,2,4-trichlorobenzene (TCB) as the solvent. The system was calibrated with a standard material (NBS 1475) with a weight-average molecular weight of 52 000 g/mol and an intrinsic viscosity of 1.01 dL/g. The refractive index increment, do/dc, was calculated from the calibrated DRI detector as 0.11 mL/g. Molecular weights for the polyethylene polymers were calculated from the intrinsic viscosity detector using the following Mark-Houwink parameters; K=$4.5 \times 10^4$ dL/g and a=0.735 established for linear polyethylene from a polystyrene calibration.

SEC with the multiple detectors can detect differences between the hydrodynamic volume of linear and branched polymers. Simultaneous measurement of intrinsic viscosity [η], and absolute molecular weight, $M_{LS}$, for each fraction of polymer separated by the chromatography columns can provide information about the structure of branched polymers. Mark-Houwink plots (log [η] vs log [$M_w$]) for each slice of the SEC elution, can be used to qualitatively observe branching. The linear standard polyethylene polymers behave in a fashion described by the Mark-Houwink relation: [η]=$KM^a$, where K and a can be obtained from the slope and intercept of the Mark-Houwink plot. However, branched polymers begin to deviate from linear behavior at high molecular weights, that is, the slopes of the Mark-Houwink plot for the branched polymer deviate from that of the linear standard. The deviation from linear behavior is subtle at low branch point density but became more apparent as branch point density is increased. In accordance with the present invention, this deviation from linear behavior is observed in the high molecular weight fractions of the inventive samples, that is, the inventive samples have long branched polymer chains. In contrast, the comparative samples conform to the linear relationship of Mark-Houwink plot in all the molecular weight fractions, indicating they do not contain any long chain branching in the polymers. SCBD data can be obtained using a SEC-FM high temperature heated flow cell (Polymer Laboratories) as reported in the literature (P. J. DesLauriers, D. C. Rohlfing, and E. T. Hsieh, Quantifying short chain branching microstructures in ethylene 1-olefin copolymers using size exclusion chromatography and Fourier transform infrared spectroscopy (SEC-FTIR) *Polymer*, 2002, 43, 159).

Analytical Temperature Rising Elution Fractionation (TREF) technique was carried out on a PolyChar TREF 200+ instrument. 40 mg of polymer sample and 20 mL of 1,2,4-trichlorobenzene were sequentially charged into the vessel to dissolve the polymer. Then an aliquot of the resulting polymer solution was loaded on the column and cooled at 0.5° C./min to 35° C. Afterward, the elution began using a 0.5 mL/min flow rate and heating at 1° C./min up to 140° C.

Comonomer distribution breadth index (CDBI), defined as the weight percent of the ethylene copolymer having a comonomer content within 50 percent of the median total molar comonomer content, can be calculated by the data obtained from TREF, as described in the literature (L. Wild, T. R. Ryle, D. C. Knobeloch, and I. R. Peat, Determination of branching distributions in polyethylene and ethylene copolymers *J. Polym. Sci. Polym. Phys. Ed.*, 1982, 20, 441).

Copolymer Compounding/Extrusion and LLDPE Pellets

The copolymers produced in accordance with the present invention may also be blended with additives to form compositions that can then be used in articles of manufacture. Those additives include antioxidants, nucleating agents, acid scavengers, plasticizers, stabilizers, anticorrosion agents, blowing agents, other ultraviolet light absorbers such as chain-breaking antioxidants, etc., quenchers, antistatic agents, slip agents, pigments, dyes and fillers and cure agents such as peroxide. These and other common additives in the polyolefin industry may be present in polyolefin compositions from 0.01 to 50 wt % in one embodiment, and from 0.1 to 20 wt % in another embodiment, and from 1 to 5 wt % in yet another embodiment, wherein a desirable range may comprise any combination of any upper wt % limit with any lower wt % limit.

In particular, antioxidants and stabilizers such as organic phosphites and phenolic antioxidants may be present in the polyolefin compositions from 0.001 to 5 wt % in one embodiment, and from 0.02 to 0.5 wt % in yet another embodiment. Non-limiting examples of organic phosphites that are suitable are tris(2,4-di-tert-butylphenyl)phosphite (IRGAFOS 168) and tris(nonyl phenyl)phosphite (WESTON 399). Non-limiting examples of phenolic antioxidants include octadecyl 3,5-di-t-butyl-4-hydroxyhydrocinnamate (IRGANOX 1076) and pentaerythrityl tetratris(3,5-di-tert-butyl-4-hydroxyphenyl)propionate (IRGANOX 1010); and 1,3,5-tri(3,5-di-tert-butyl-4-hydroxybenzyl-isocyanurate (IRGANOX 3114).

Fillers and fatty acid salts may also be present in the polyolefin including LLDPE composition. Filler may be present from 0.1 to 65 wt % in one embodiment, and from 0.1 to 45 wt % of the composition in another embodiment, and from 0.2 to 25 wt % in yet another embodiment. Desirable fillers include but not limited to titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3^-$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art.

Fatty acid salts may be present from 0.001 to 6 wt % of the composition in one embodiment, and from 0.01 to 2 wt % in another embodiment. Examples of fatty acid metal slats include lauric acid, stearic acid, succinic acid, stearyl lactic acid, lactic acid, phthalic acid, benzoic acid, hydroxystearic acid, ricinoleic acid, naphthenic acid, oleic acid, palmitic acid, and erucic acid, suitable metals including Li, Na, Mg, Ca Sr, Ba, Zn, Cd, Al, Sn, Pb and so forth. Desirable fatty acid salts are selected from magnesium stearate, calcium stearate, sodium stearate, zinc stearate, calcium oleate, zinc oleate, and magnesium oleate.

In the physical process of producing the blend of polyolefin and one or more additives, sufficient mixing should take place to assure that a uniform blend will be produced prior to conversion into a finished product. The polyolefin can be in any physical form when used to blend with the one or more additives. In one embodiment, reactor granules, defined as the granules of polymer that are isolated from the polymerization reactor, are used to blend with the additives. The reactor granules have an average diameter of from 10μ to 5 mm and from 50μ to 10 mm in another embodiment. Alternately, the polyolefin is in the form of pellets, such as, for example, having an average diameter of from 1 mm to 6 mm that are formed from melt extrusion of the reactor granules.

One method of blending the additives with the polyolefin is to contact the components in a tumbler or other physical blending means, the polyolefin being in the form of reactor granules. This can then be followed, if desired, by melt blending in an extruder. Another method of blending the components is to melt blend the polyolefin pellets with the additives directly in an extruder, Brabender or any other melt blending means.

Rheological tests were carried out on compression molded disk of the polymer pellets in an ARES-G2 Rheometer (TA Instrument) using parallel plate geometry. Small strain (3%) dynamic mechanical experiments were performed at 190° C. in a nitrogen atmosphere. The resulting complex viscosity as a function of imposed oscillatory frequency ($|\eta^*|$ vs. $\omega$) was then curve fitted with modified three parameter Carreau-Yasuda (CY) empirical model:

$$|\eta^*(\omega)| = \eta_o/[1+(\tau_\eta \omega)^a]^{(1-n)/a},$$

to obtain the zero shear viscosity ($\eta_o$), characteristic viscous relaxation time ($\tau_\eta$) and the breadth parameter (a). Due to the limitation of the measurement range, n is taken as 0.1818 based on theoretical value. (Graessley W. W. Viscosity of Entangling Polydisperse Polymer, *J. Chem. Phys.* 1967, 47, 1942-1953)

The Janzen-Colby model was used for characterizing the long chain branching effect on polymer melt viscosity (J. Janzen and R. H. Colby, Diagnosing long-chain branching in polyethylenes, *Journal of Molecular Structure* 1999, 485-486, 569-584). The long chain branch content (vertexes per a million carbons) was denoted as J-C α value. For the cases with polymer dispersity of >2.0, a small correction based on Yau's article (Wallace W. Yau, A rheology theory and method on polydispersity and polymer long-chain branching, *Polymer* 2007, 48, 2362-2370) was also required to offset the effect of molecular weight breadth.

The date of storage modulus (G') and loss modulus (G") as a function of shear rate (γ) can also be obtained using Cox-Merz rule. Melt strength index (MSI), defined as the ratio of storage modulus and loss modulus (G'/G") at a shear rate of 0.03 $s^{-1}$, is used as an empirical parameter for evaluating melt quality in the film blowing process. In accordance with the present invention, MSI value is between 0.01 and 0.80.

Film Extrusion and Film Properties

The polymers produced according to the present invention are more easily extruded into film products by cast or blown film processing techniques as compared to commercial octene-1 LLDPE and commercial mLLDPE (I) with comparable melt index and density. The resins in this invention have, for a comparable MI, a MWD narrower than hexene copolymer resins but broader than mLLDPEs. The resins made from this invention also exhibit a molecular structure, such as comonomer composition distribution, similar to typical mLLDPE resins.

More specifically, in the present invention, the compounded polymer resins are extruded through a single screw laboratory extruder and blown into film under the following conditions: BUR=2.5:1, gauge=1 mil, melt temperature=425° F. Film dart impact (g/mil) was tested by ASTM D-1709, and film Elmendorf Tear (g/mil) by ASTM D-1922 and secant modulus by ASTM D-882, film haze by ASTM D-1003, film clarity by ASTM D-1746, and gloss by ASTM D-2457.

EXAMPLES

Examples 1-1 to 1-3

(1) Synthesis of Magnesium-Titanium Based Catalyst Precursor

Catalyst precursor was synthesized as described in U.S. Pat. No. 7,618,913. Anhydrous hexane (2 L), magnesium (31.9 g), iodine (3.3 g), 2-methyl-1-propanol (5.0 mL), titanium propoxide (7.2 mL) and butyl chloride (5.0 mL) were successively charged into a 5 L reactor equipped with an anchor stirrer driven by a magnetic motor. The reactor was heated to 85° C. within 60 minutes and then cooled to 80° C. within 20 minutes. Tetraethoxy orthosilicate (20 mL) and silicon tetrachloride (40 mL) were added to the reactor and held at 80° C. for 40 minutes to yield a yellow-brown reaction product in the suspension. Next, titanium propoxide (38.9 mL) and $TiCl_4$ (18.3 mL) were charged to the suspension at 80° C., and the slurry mixture was stirred for 0.5 hour to yield organic silicon complex containing titanium, followed by the slow introduction of 2,5-dimethylpyridine (16.0 mL) in the suspension. The reaction was stirred at 80° C. for 1 hour to yield a brown/yellow reaction product, which was used without further separation. Then n-butyl chloride (40 mL) was added at the rate of 0.96 mL/min and held for 4 hours. The suspension was cooled to 50° C., resulting in a brownish precipitate, which was subsequently washed 3 times with 2 L hexane at 50° C. Drying the precipitate led to a solid magnesium-based supported titanium catalyst precursor. Analysis shows that the supported catalyst precursor composition contains 7.5 wt % Ti, 1.5 wt % Si and 14.7 wt % Mg.

(2) Preparation of Ethylene Prepolymer or Prepolymerized Catalyst Component

Two liters of n-hexane, 50 mmoles of EADC, certain amount of MMAO (130 mmoles for sample 1-1, 110 mmoles for sample 1-2, and 90 mmoles for sample 1-3) and a quantity of the catalyst precursors containing 12.6 mmoles of titanium were introduced into a 5 liter stainless steel reactor under nitrogen atmosphere, provided with a stirring device rotating at 750 rpm and heated to 68° C. Hydrogen was then introduced to obtain a partial pressure of 0.5 bar, and ethylene was introduced at a steady flow rate of 160 g/h for 3 hours. Subsequently, the reactor was degassed and its contents were transferred into a flask evaporated in which the hexane was removed under vacuum followed by nitrogen heating to 40-50° C. After evaporation, 480 g of prepolymer containing 38.0-42.0 g polyethylene per mmoles of titanium were obtained as an ethylene prepolymer (inventive example 1-1, example 1-2, and example 1-3) as showed in Table 1. The prepolymer was stored under nitrogen and would be used for the sequential gas phase polymerization. Small amount of the prepolymer was taken to be deactivated with water and then washed with hexane prior to being used for property test.

Comparative Examples 1-1 and 1-9

Comparative examples were prepared in the same manner as in Example 1-1 except that a given amounts of different cocatalysts (Table 1) were used. The resulting prepolymerized catalyst components are labeled as Comparative examples 1-1 to 1-9. Table 1 summarizes the prepolymerization results and rheological study based on the Janzen-Colby model. The prepolymerization yield falls into the typical range of 30-60 g PE/mmol Ti. The inventive examples from MMAO/EADC show sporadic amount of long chain branches (JC–α≈3 LCBs per million carbons), while no significant LCBs are detected in the comparative examples.

TABLE 1

Properties of ethylene prepolymer or prepolymerized catalyst component

| Sample | Cocatalyst | Co-catalyst amount (moles) | Co-catalyst ratio | Yield (g/mmol Ti) | JC-α (LCB/ $10^6$ C) |
|---|---|---|---|---|---|
| 1-1 | MMAO/EADC | 130/50 | 2.6/1 | 41 | 3.2 |
| 1-2 | MMAO/EADC | 110/50 | 2.2/1 | 42 | 2.8 |
| 1-3 | MMAO/EADC | 90/50 | 1.8/1 | 38 | 3.2 |
| Comparative 1-1 | TnOA | 50 | — | 42 | 0 |
| Comparative 1-2 | TEA/EADC | 90/50 | 1.8/1 | 38 | Very low |
| Comparative 1-2 | TEA/EADC | 72/60 | 1.2/1 | 42 | Very low |
| Comparative 1-3 | TEA/EADC | 90/60 | 1.5/1 | 42 | Very low |
| Comparative 1-4 | TEA | 50 | — | 46 | 0 |
| Comparative 1-5 | TiBA | 50 | — | 42 | 0 |
| Comparative 1-6 | MMAO | 50 | — | 60 | 0 |
| Comparative 1-7 | EADC | 50 | — | Very low | * |
| Comparative 1-8 | MAO | 50 | — | 47 | 0 |
| Comparative 1-9 | DMAC | 50 | — | 34 | Very low |
| Comparative 1-10 | TnOA/DMAC | 72/40 | 1.8/1 | 42 | Very low |

* Not enough sample for measurement

Examples 2-1 to 2-6

(3) Gas Phase Copolymerization of Ethylene and 1-Hexene

Co-polymerization was carried out in an 8 liter autoclave designed for stirred gas phase polymerization, equipped with an anchor stirrer with magnetic stirrer drive above the top of autoclave and a valve at the base of the autoclave to withdraw polymer. The temperature was regulated using steam/water via the outer jacket of the autoclave. A fluidized seed particle of polymer (400 g) and 60 g of the ethylene prepolymer (Sample 1-1) previously prepared were introduced into the gas phase polymerization reactor under nitrogen atmosphere, provided with a stirring device rotating at 150 rpm and heated to 60° C. Nitrogen and hydrogen were charged into the reactor to provide total pressure of 3 bars and a given ratio of hydrogen and ethylene ($P_{H2}/P_{C2}$) partial pressure indicated in Table 2. After the reactor temperature was raised to 85° C., ethylene (5 bars) was charged into the reactor to obtain total pressure of 10 bars, together with 1-hexene ($C_6$) at a given $C_6/C_2$ molar ratio indicated in Table 2. The copolymerization was maintained at 85° C. The feed of $C_6/C_2$ was continued at a given $C_6/C_2$ molar ratio until 1000 g of ethylene was consumed during the gas phase polymerization. The reactor was then cooled down and degassed and an ethylene/1-hexene polymer free from agglomerate was drawn off. The polymer was collected for property tests. The results are reported as examples 2-1 to 2-6 in Table 2.

Comparative Examples 2-1 to 2-3

The gas phase copolymerization of ethylene and 1-hexene was conducted in the same manner as in Example 2, except that an ethylene prepolymer made with TEA/EADC (comparative sample 1-2) was used.

Comparative Sample 3-1 to 3-3

The gas phase copolymerization of ethylene and 1-hexene was conducted in the same manner as in Example 2, except that an ethylene prepolymer made with TnOA (comparative sample 1-1) was used.

Comparative Samples 4-1 and 4-2

The gas phase copolymerization of ethylene and 1-hexene was conducted in the same manner as in Example 2, except that an ethylene prepolymer made with TnOA/DMAC (comparative sample 1-10) was used.

Comparative Samples 5-1 and 5-2

The gas phase copolymerization of ethylene and 1-hexene was conducted in the same manner as in Example 2, except that an ethylene prepolymer made with MMAO (comparative sample 1-6) was used.

Comparative Sample 6

The gas phase copolymerization of ethylene and 1-hexene was conducted in the same manner as in Example 2, except that an ethylene prepolymer made with MAO (comparative sample 1-8) was used.

Comparative Sample 7

The gas phase copolymerization of ethylene and 1-hexene was conducted in the same manner as in Example 2, except that an ethylene prepolymer made with DMAC (comparative sample 1-9) was used.

TABLE 2

Gas Phase C2/C6 Copolymerization with ethylene prepolymer

| Example | Ethylene prepolymer | Cocatalyst used in prepolymer preparation | H2/C2 ratio | C6/C2 ratio | Catalyst activity | Bulk density | Density | MI | MFR |
|---|---|---|---|---|---|---|---|---|---|
| 2-1 | Sample 1-1 | MMAO/EADC | 0.32 | 0.0808 | 1130 | 0.343 | 0.9154 | 0.897 | 36.5 |
| 2-2 | Sample 1-1 | MMAO/EADC | 0.21 | 0.0785 | 1465 | 0.332 | 0.9150 | 0.207 | 35.8 |
| 2-3 | Sample 1-1 | MMAO/EADC | 0.21 | 0.0808 | 1480 | 0.335 | 0.9138 | 0.229 | 33.4 |
| 2-4 | Sample 1-1 | MMAO/EADC | 0.24 | 0.0785 | 1292 | 0.338 | 0.9155 | 0.238 | 36.7 |
| 2-5 | Sample 1-1 | MMAO/EADC | 0.26 | 0.0785 | 1546 | 0.342 | 0.9161 | 0.292 | 33.6 |
| 2-6 | Sample 1-1 | MMAO/EADC | 0.27 | 0.0785 | 1093 | 0.330 | 0.9156 | 0.338 | 34.8 |
| 2-7 | Sample 1-1 | MMAO/EADC | 0.53 | 0.0785 | 1208 | 0.343 | 0.9153 | 0.897 | 54.0 |
| Comparative 2-1 | Comparative 1-2 | TEA/EADC | 0.29 | 0.0808 | 1043 | 0.362 | 0.9170 | 0.808 | 31.3 |
| Comparative 2-2 | Comparative 1-2 | TEA/EADC | 0.31 | 0.0808 | 1579 | 0.360 | 0.9158 | 0.883 | 33.1 |
| Comparative 2-3 | Comparative 1-2 | TEA/EADC | 0.32 | 0.0808 | 1009 | 0.368 | 0.9162 | 1.047 | 32.3 |
| Comparative 3-1 | Comparative 1-1 | TnOA | 0.20 | 0.0898 | 1416 | 0.357 | 0.9158 | 0.928 | 30.9 |
| Comparative 3-2 | Comparative 1-1 | TnOA | 0.16 | 0.0898 | 1010 | 0.346 | 0.9154 | 0.733 | 29.0 |
| Comparative 3-3 | Comparative 1-1 | TnOA | 0.071 | 0.0898 | 1185 | 0.326 | 0.9144 | 0.651 | 31.8 |
| Comparative 4-1 | Comparative 1-10 | TnOA/DMAC | 0.42 | 0.0898 | 771 | 0.341 | 0.9188 | 0.764 | 28.2 |
| Comparative 4-2 | Comparative 1-10 | TnOA/DMAC | 0.33 | 0.0898 | 918 | 0.354 | 0.9175 | 0.902 | 31.8 |
| Comparative 5-1 | Comparative 1-6 | MMAO | 0.29 | 0.0898 | 707 | 0.345 | 0.9206 | 0.939 | 27.4 |
| Comparative 5-2 | Comparative 1-6 | MMAO | 0.31 | 0.0988 | 1022 | 0.365 | 0.9195 | 1.563 | 27.4 |
| Comparative 6 | Comparative 1-8 | MAO | 0.20 | 0.0898 | 539 | 0.294 | 0.9177 | 0.412 | 32.0 |
| Comparative 7 | Comparative 1-9 | DMAC | 0.29 | 0.0785 | 612 | 0.352 | 0.9178 | 0.068 | 28.4 |

FIG. 1 compares the rheological behavior for the inventive examples 2-1 with the comparative examples 2-2 and 3-1 with similar MI and density, which are prepared from different cocatalysts, MMAO/EADC, TEA/EADC and TnOA, respectively. As is evident from FIG. 1, the inventive examples show improved shear shinning behavior and higher melt strength, potentially suitable for applications requiring high melt strength and excellent processability, such as the manufacture of geomembranes.

Table 3 compares the properties of polymers from different cocatalysts. The inventive samples from MMAO/EADC cocatalyst contain high molecular weight tail and have sporadic long chain branches in high molecular weight portions, while the comparative examples from TnOA and TEA/EADC in Table 3 do not show any long chain branches, even at high molecular weight portions.

TABLE 3

Properties of LLDPE polymers

| Sample | Ethylene prepolymer | Cocatalyst used in prepolymer preparation | MI (g/10 min) | $M_w$ (kg/mol) | PDI | $M_z$ (g/mol) | JC-α | Wt % below 35° C.* | CDBI (%) |
|---|---|---|---|---|---|---|---|---|---|
| Comparative sample 3-1 | Comparative 1-1 | TnOA | 0.93 | 117 | 4.36 | 344 | 0 | 18.4 | 11 |
| Comparative 2-2 | Comparative 1-2 | TEA/EADC | 0.88 | 120 | 4.58 | 366 | 0 | 15.4 | 12 |
| Inventive sample 2-7 | Sample 1-1 | MMAO/EADC | 0.90 | 126 | 5.95 | 503 | 2.8 | 15.3 | 17 |
| Inventive sample 2-2 | Sample1-1 | MMAO/EADC | 0.21 | 180 | 4.47 | 526 | 2.7 | 15.0 | 17 |

*measured by aTREF.

(4) Gas Phase Copolymerization of Ethylene and 1-Butene

Example 3-1 to 3-5

Ethylene prepolymer was prepared in the same manner as in Example 1. The resulting prepolymer are then used for the gas phase copolymerization of ethylene and 1-butene in the same manner as in Example 2 except the ratio of hydrogen and ethylene ($P_{H2}/P_{C2}$) partial pressure and a $C_4/C_2$ molar ratio as shown in Table 4.

Comparative Samples 8-1 and 8-2

An ethylene prepolymer was prepared in the same manner as in Example 3 except that 60 mmoles of TnOA was used. The resulting prepolymer is then used for the gas phase copolymerization of ethylene and 1-butene in the same manner as in Example 2.

TABLE 4

Gas Phase C2/C4 Copolymerization with ethylene prepolymer

| Example | Ethylene prepolymer | Cocatalyst used in prepolymer preparation | H2/C2 ratio | C4/C2 ratio | Catalyst activity | Bulk density | Density | MI | MFR | $T_m$ (° C.) |
|---|---|---|---|---|---|---|---|---|---|---|
| 3-1 | Sample 1-1 | MMAO/EADC | 0.143 | 0.103 | 686 | 0.355 | 0.9033 | 0.534 | 28.2 | 120.5 |
| 3-2 | Sample 1-1 | MMAO/EADC | 0.214 | 0.1010 | 626 | 0.362 | 0.9041 | 0.809 | 30.5 | 120.2 |
| 3-3 | Sample 1-1 | MMAO/EADC | 0.229 | 0.1010 | 624 | 0.362 | 0.9069 | 0.764 | 30.5 | 120.0 |
| 3-4 | Sample 1-1 | MMAO/EADC | 0.243 | 0.1010 | 652 | 0.360 | 0.9020 | 0.734 | 30.7 | 121.0 |
| 3-5 | Sample 1-1 | MMAO/EADC | 0.257 | 0.1010 | 941 | 0.368 | 0.9044 | 1.247 | 31.4 | 120.7 |
| Comparative 8-1 | Comparative 1-1 | TnOA | 0.16 | 0.0898 | 623 | 0.353 | 0.9127 | 1.26 | 25.4 | 123.5 |
| Comparative 8-2 | Comparative 1-1 | TnOA | 0.143 | 0.1010 | 693 | 0.378 | 0.9074 | 1.40 | 27.3 | 122.2 |

As shown in Table 4, under the similar polymerization conditions (H2/C2 and C4/C2 ratios), polymers with lower density were obtained with the cocatalyst (MMAO/EADC) than the case with the cocatalyst TnOA. This indicates the inventive ethylene prepolymers or polymerized catalyst components show improved comonomer response compared with those with TnOA.

(5) Slurry Polymerization

Example 3-6

A 2 L stainless steel reactor was preheated under vacuum at 120° C. for 2 hours. Then the reactor was purged with nitrogen and successively charged at 65° C. with 1 L of dry hexane, 1.5 mL of 1.0 M MMAO/heptane solution, 1.0 mL of 1.0 M EADC/hexane solution, and 20 mg of solid catalyst precursor aforementioned. The internal pressure was increased to 85 psi with hydrogen (29 psi of nitrogen). The reactor was closed, the stirring rate was increased to 750 rpm, and the internal temperature was raised to 85° C. Then, 60 mL of 1-hexene was charged, followed by charging ethylene to maintain the total pressure at about 145 psi. The polymerization was carried out immediately and continued at 85° C. for 60 minutes. The ethylene feed was subsequently stopped and the reactor cooled and vented. The polymer slurry was treated with methanol to deactivate any residual catalyst, filtered, and dried under vacuum to constant weight. 75 g of polymer (yield: 3750 g PE/g catalyst hr) was obtained.

Example 3-7

The slurry polymerization was conducted in the same manner as in Example 10-1, except that no 1-hexene was used in the polymerization. 30 g of homopolymer (yield: 1500 g PE/g catalyst hr) was obtained.

(6) Blown Film Study

Example 4

The LLDPE polymer powder was screened and dry-blended with suitable additives such as Irganox-1076 (available from Ciba-Geigy), TNPP, Polybloc Talc, zinc stearate and Erucamide, in a Henschel mixer. Pelletizing the compounded powder was carried out on a twin-extruder equipped with an underwater pelletizer. The polymer pellets were extruded through a single screw laboratory extruder and blown into film under the following conditions: BUR=2.5:1, gauge=1 mil, melt temperature=425° F. Sample 4 is from the polymer prepared using the MMAO/EADC as a cocatalyst from gas phase polymerization. The comparative examples include 9-1 (the polymer prepared from TEA/EADC as a cocatalyst), 9-2 (the polymer prepared from TnOA), 9-3 (a C8 LLDPE polymer) and 9-4 (mLLDPE polymer).

Figure 2A:
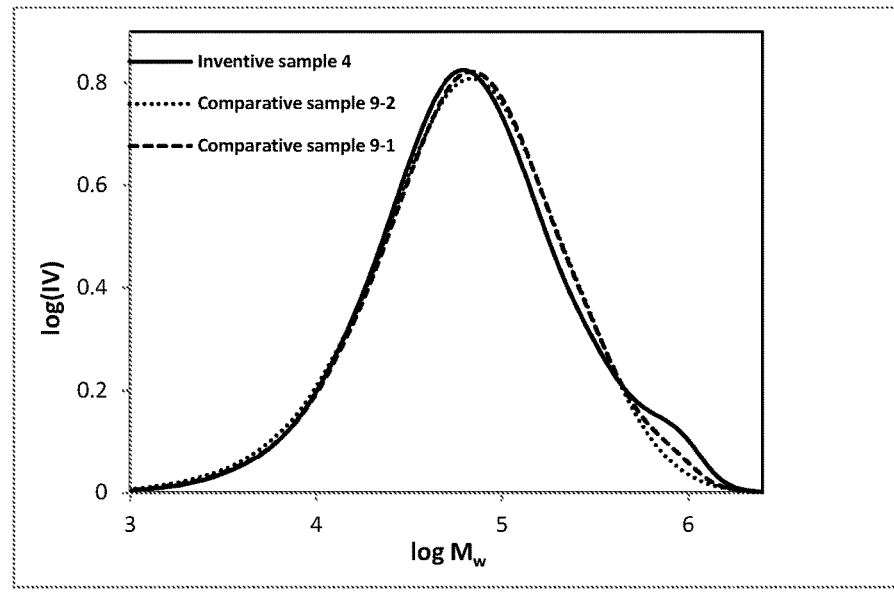
FIG. 2a shows GPC curves for the inventive sample 4 and the comparative LLDPE samples 9-1 and 9-2 of Table 3, respectively.
Figure 2B:
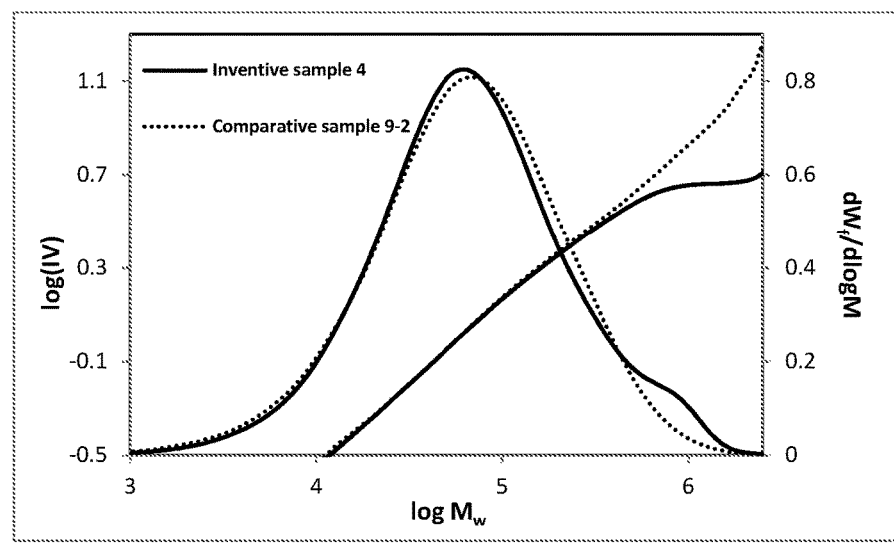
FIG. 2b shows curves of intrinsic viscosity and $dW_f/d(\log M)$ as a function of molecular weight for the inventive LLDPE sample 4 and the comparative LLDPE sample 9-2 of Table 3, respectively.

FIG. 2 compares the GPC curves of the inventive sample 4 from MMAO/EADC with the comparative examples 9-2 from TnOA. As is evident from FIG. 2, the inventive example 4 contains a high molecular tail. The curves of log(IV) vs log M for these two inventive samples show linear relationship at moderate molecular weight fractions (<300,000 g/mol), but deviate linear relationship at high molecular weight fractions because the long chain branches occurring in very long polymer chains reduce gyration of radius. In contrast, the curve of log(IV) vs log M for the comparative example 9-2 show linear relationship in all the measurement range of molecular weight fractions, indicating the polymer chains are linear and free of long chain branches. The long chain branches account for the processability improvement of the inventive polymers. As shown in Table 5, melt pressure for the inventive sample 4 is much lower than that of comparative example 9-2.

Figure 3A:
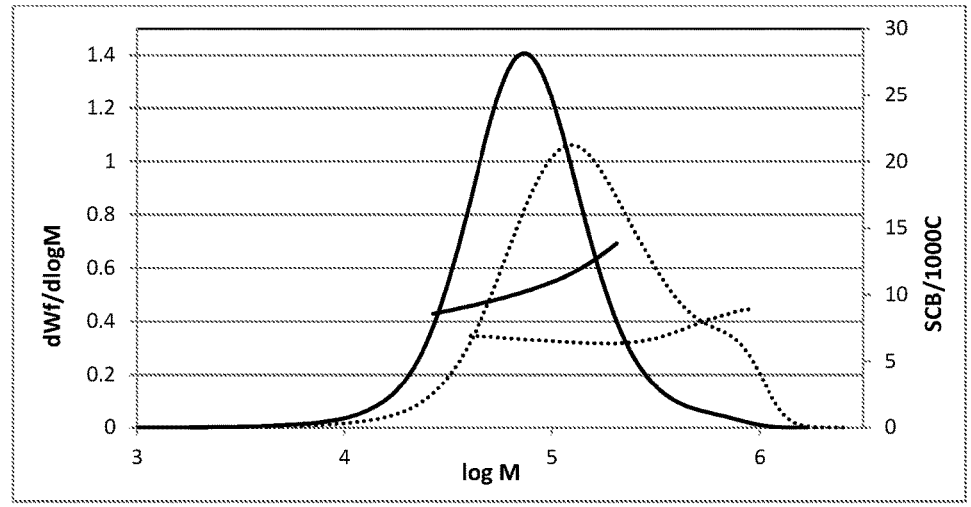
FIGS. 3a and 3b show GPC curves with SCBD profile for two high molecular weight fractions ($M_w$>100,000 g/mol) for the inventive LLDPE sample 4 and the comparative sample 9-2, of Table 3, respectively.
Figure 3B:
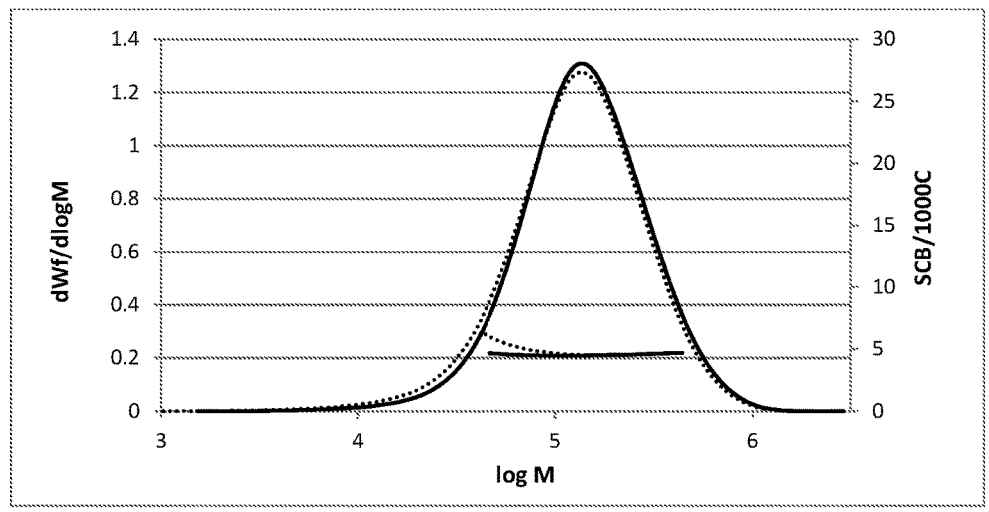

Example 4 and Comparative example 9-2 were further analyzed by fractionating into 6 portions with gradient ratios of solvent/nonsolvent (o-dichlorobenzen/ethylene glycol dibutyl ether) in a preparation TREF. FIG. 3 compares the GPC curves with SCBD profiles for the last two fractions with $M_w$>100,000 g/mol. As shown in FIG. 3b, the fractions for the comparative sample from TnOA show flat SCBD profile across all the molecular weight range. In contrast, as shown in FIG. 3a, for the inventive sample from MMAO/EADC, the fractions contain a high molecular weight tail and show reverse SCBD profile, which account for the improvement in processability, melt strength and optical properties for the blown film. The inventive sample was also fractionated with varying temperatures in a preparation TREF. The fractions eluted at high temperature (>85° C.) also show a high molecular weight tail along with reversed comonomer composition distribution.

The unique polymer structure of the inventive sample provides it with advantages in certain properties over other comparative polymers. As shown in Table 5, the inventive resin from MMAO/EADC has a superior balance of physical properties and optical properties. Compared to the resin from TnOA (comparative sample 9-1), the inventive resin (Sample 4) shows improved optical properties (low haze, high clarity and high gloss), which are in par with those of C8-LLDPE and mLLDPE polymers (Comparative samples 9-3 and 9-4), while it still maintains good tear strength, toughness (e.g. dart impact), and stiffness (secant modulus at 1% strain).

TABLE 5

| | Blown film properties | | | | |
|---|---|---|---|---|---|
| | Example | | | | |
| | Sample 4 | Comparative sample 9-1 | Comparative sample 9-2 | Comparative sample 9-3 C8 LLDPE | Comparative sample 9-4 mLLDPE |
| Ethylene prepolymer | Sample 1-1 | Comparative 1-2 | Comparative 1-1 | — | — |
| Cocatalyst used in prepolymerization | MMAO/EADC | TEA/EADC | TnOA | — | — |
| MI | 0.67 | 0.71 | 0.70 | 0.99 | 0.96 |
| Density | 0.9188 | 0.9206 | 0.9199 | 0.9214 | 0.9213 |
| $M_z/M_w$ | 3.2 | 2.9 | 2.9 | 3.2 | 1.9 |
| $T_m$ (° C.) | 124.1 | 124.4 | 124.7 | 123.4 | 118.7 |
| Haze | 9.9 | 15.0 | 21.0 | 10.1 | 10.2 |
| Clarity | 91.8 | 89.4 | 86.6 | 92.1 | 93.6 |
| Gloss (45°) | 80 | 65 | 50 | 75 | 73 |
| MSI | 0.33 | 0.13 | 0.10 | 0.08 | 0.04 |
| Dart impact | 496 | 364 | 495 | 270 | 468 |
| MD tear | 385 | 346 | 383 | 325 | 254 |
| TD tear | 661 | 611 | 614 | 548 | 347 |
| MD sec. mod @1% strain | 17288 | 18592 | 16909 | 17442 | 17676 |
| TD sec. mod @1% strain | 19625 | 19356 | 17825 | 16842 | 17910 |
| Melt pressure (psi) | 4513 | 4817 | 5290 | 4497 | 6090 |

As such, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Whenever a numerical range with a lower limit and an upper limit is disclosed, any number falling within the range is specifically disclosed. Moreover, the indefinite articles "a" or "an", as used in the claims, are defined herein to mean one or more than one of the element that it introduces.

What is claimed is:

1. A process for making polyethylene copolymers, comprising the reaction of at least the following components:
   a. a Ziegler-Natta catalyst precursor comprising titanium;
   b. an activator comprising organohalogenous aluminum compounds;
   c. ethylene; and
   d. one or more alpha-olefins;
   wherein the organohalogenous aluminum compounds are prepared in-situ by reacting alkylaluminoxane compounds with halogenated alkylaluminum compounds during polymerization.

2. The process of claim 1, wherein the alkylaluminoxane compounds have the formula:

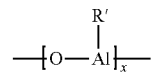

wherein R' is a $C_1$-$C_{20}$ hydrocarbyl, and wherein x is 1-40.

3. The process of claim 1, wherein the alkylaluminoxane compounds are selected from methylalumoxane, modified methylalumoxane, tetraethyldialumoxane, tetrabutylalumoxane, bis(diisobutylaluminum) oxide, ethylalumoxane, isobutylalumnoxane, and polymethylalumoxane, and mixtures or combinations thereof.

4. The process of claim 1, wherein the halogenated alkylaluminum compounds have the formula:

wherein R" a is $C_1$-$C_{20}$ alkyl group, and wherein m is an integer between 1 and 2.

5. The process of claim 1, wherein the halogenated alkylaluminum compounds are selected from dimethylaluminum chloride, diethylaluminum halides, such as dimethylaluminum chloride, diethylaluminum chloride, diisobutylaluminum chloride, di(t-butyl)aluminum chloride, diamylaluminum chloride, methylaluminum dichloride, ethylaluminum dichloride, isobutylaluminum dichloride, isobutylaluminum dichloride, t-butylaluminum dichloride and amylaluminum dichloride, and mixtures or combinations thereof.

6. The process of claim 1, wherein the molar ratio of halogenated alkylaluminum to alkylaluminoxane is about 0.1 to 5.

7. The process of claim 1, wherein components (a)-(c) are first reacted to prepare a prepolymer, and wherein the prepolymer then initiates copolymerization of ethylene and one or more olefins without additional cocatalyst in the presence of hydrogen to produce the polyethylene copolymers.

8. The process of claim 7, wherein the prepolymer is from about 0.1 to about 1000 grams per gram of the catalyst precursor.

9. The process of claim 7, wherein the prepolymer has a sporadic amount of long chain branches in high molecular weight fractions of the polyethylene copolymers.

10. The process of claim 7, wherein the prepolymer has a J-C α value (LCB per $10^6$ total carbon atoms) of less than about 5.

11. The process of claim 7, wherein the prepolymer has an average particle size ranging from about 10 to about 500 micron.

12. The process of claim 1, wherein the polyethylene copolymers have a sporadic amount of long chain branches in high molecular weight fractions, a high molecular weight tail, and a reversed comonomer composition distribution.

13. The process of claim 1, wherein said catalyst precursor comprises: a) a titanium compound, b) an inorganic oxide carrier, and (c) an electronic donor.

14. The process of claim 13, wherein the electronic donor is selected from substituted pyrimidine, dipyridyl, pyrazine, terpyridine and quinoline.

15. The process of claim 1, wherein the titanium compound of the catalyst precursor has the formula:

$$Ti(OR^4)_n X_{4-n}$$

wherein $R^4$ is a $C_1$-$C_{20}$ hydrocarbon, X is a halogen, and $0 \leq n \leq 4$.

16. The process of claim 1, wherein the polyethylene copolymers have a melt index from about 0.1 to about 100 g/10 min; a molecular weight distribution ($M_w/M_n$) from about 3 to 6; and a high molecular weight tail with a reverse comonomer composition distribution in the high molecular weight fractions of the polyethylene copolymers.

17. The process of claim 1, wherein the polyethylene copolymers have a density from about 0.90 to about 0.94 g/cm$^3$.

18. The process of claim 1, wherein the polyethylene copolymers can be fractionated by preparation TREF with gradient ratios of solvent/nonsolvent and the fractions eluted with average molecular weight ($M_w$) of higher than 100,000 g/mol having a reversed comonomer composition distribution.

19. The process of claim 1, wherein the polyethylene copolymers has a melt strength index, defined as the ratio of storage modulus to loss modulus (G'/G") at a shear rate of 0.03 s$^{-1}$, is 0.2 to 1.0.

20. The process of claim 1, wherein blown films comprising the polyethylene copolymers with thickness of 1 mil (25 μm) have a haze, determined by ASTM D-1003, ranging from 6 to 15; a gloss, determined by ASTM D-2457, ranging from 80-100; dart impart, determined by ASTM D-1709, ranging from 350 to 800; and MD tear strength, determined by ASTM D-1922, ranging from 300 to 600.

21. The process of claim 1, wherein the molar ratio of halogenated alkylaluminum to alkyl aluminoxane is greater than about 1:1.

* * * * *